June 3, 1952     C. C. SCHEELE     2,598,836
MOTOR SUPPORT
Filed Jan. 19, 1948     2 SHEETS—SHEET 1
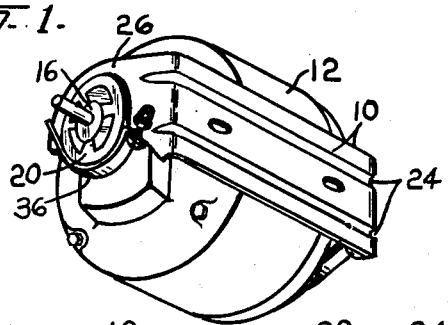
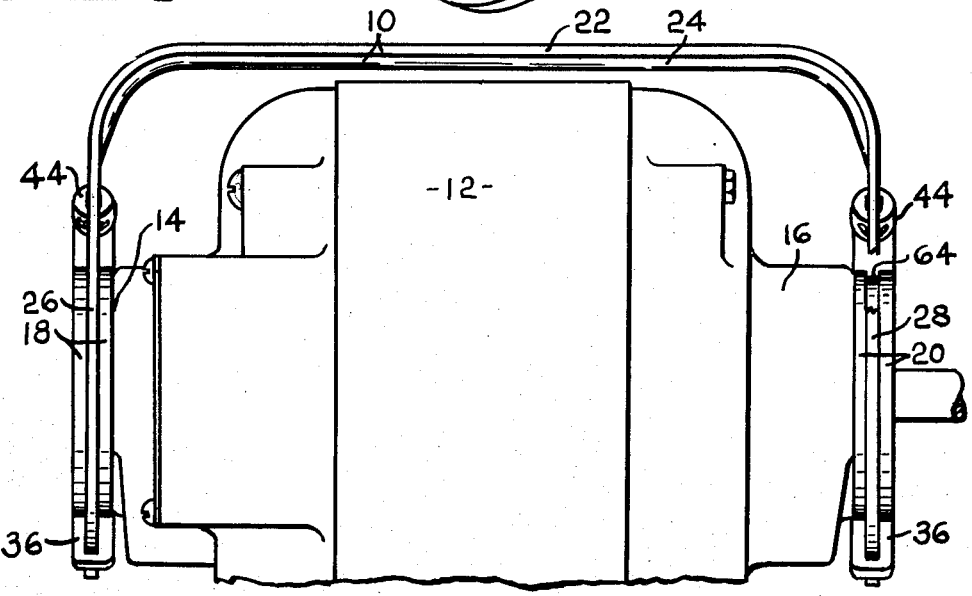
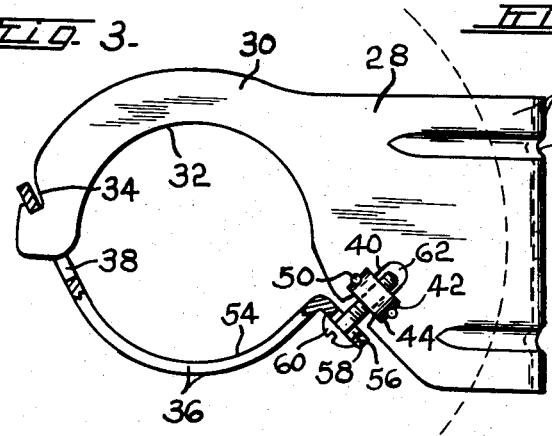
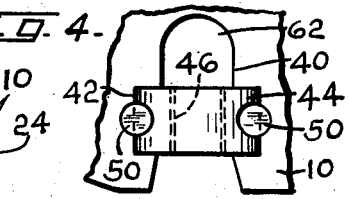
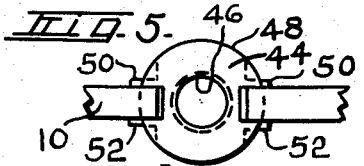
INVENTOR
CHARLES C. SCHEELE
BY
ATTORNEY June 3, 1952  C. C. SCHEELE  2,598,836
MOTOR SUPPORT
Filed Jan. 19, 1948  2 SHEETS—SHEET 2
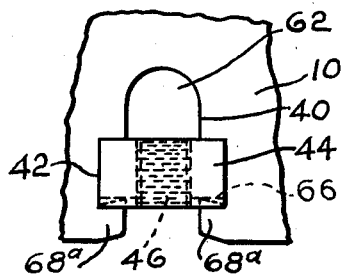
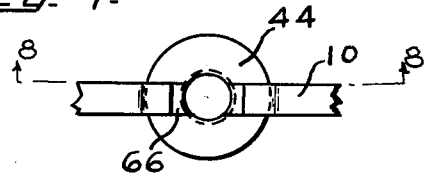
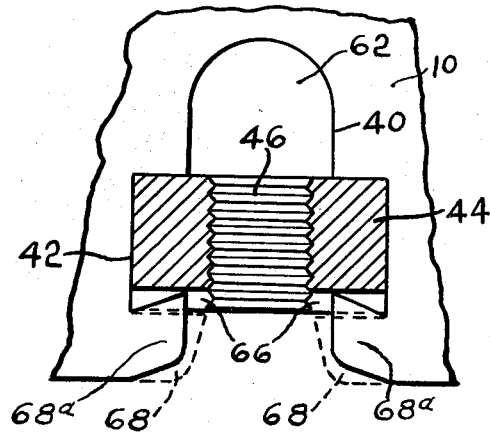
INVENTOR
CHARLES C. SCHEELE
BY
ATTORNEY Patented June 3, 1952

2,598,836

UNITED STATES PATENT OFFICE 2,598,836

MOTOR SUPPORT

Charles C. Scheele, Syracuse, N. Y., assignor to Easy Washing Machine Corporation, Syracuse, N. Y., a corporation of Delaware Application January 19, 1948, Serial No. 3,115

9 Claims. (Cl. 248—26)

1

This invention relates to support brackets, and more particularly to a support bracket adapted to demountably hold an electric motor or the like in correct axial alignment.

In power operated appliances, such as washing machines, ironers, and other power driven devices utilizing an electric motor as a source of power, it is desirable to mount the motor in a manner such that it may be quickly dismounted for replacement or repair, or quickly mounted, with assurance of true alignment and ease of completing the mounting operation. In motor mounts heretofore employed, various forms of clamp straps have been employed. While such constructions are satisfactory, in most instances such mounts are cumbersome, difficult for a single person to manipulate, require an excessive number of parts, are relatively expensive to manufacture, and are liable to loosening from vibration.

The present invention seeks to simplify such supporting brackets, and has as its object the provision of a bracket composed of a minimum number of parts, inexpensive to manufacture, effective as a support, and easily manipulated, either in the removal of or the positioning of a motor from or upon the bracket.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings, wherein like reference characters indicate like parts:

Figure 1 is a perspective view of the bracket with motor attached;

Figure 2 is a top plan view;

Figure 3 is an end view of Figure 2;

Figure 4 shows the detail of the top of the swaged nut;

Figure 5 is a detail view showing an end view of the swaged nut;

Figure 6 is a fragmentary elevational view of a modified form;

Figure 7 is an end view of Figure 6; and

Figure 8 is an enlarged sectional view taken on line 8—8 of Figure 7.

Referring to the drawing, there is shown a bracket 10 having a motor 12 positioned therein, the motor having end bearing bosses 14 and 16 about which are positioned circular rubber damping members 18 and 20 in the form of large disc washers. The bracket 10 is formed of sheet metal or other suitable material, and has a central body portion 22 which may be ribbed for strength as at 24 and integral end bracket arms 26 and 28.

Each of the bracket arms is formed to provide a hook-like extension 30, the inner marginal edge of which provides a semi-circular saddle recess 32. The outer end of the hook is notched as at 34 to receive a strap 36, the strap having a closed notch 38 adapted to slide over the hook 30 and engage the notch 34. Adjacent the inner end of the recess 32 is an open slot 40 of cruciform shape having positioned in the transverse portion 42 thereof a threaded member 44. The threaded member may take the form of a nut having internal threads 46 and a circular or cylindrical outer surface 48, the diameter of the threaded member being equal to the length of the transverse portion 42 of the slot, and of an axial length equal to the width of the transverse portion of the slot. The nut may be secured in position within the transverse portion of the slot 42 by swaging or shear upsetting the surface portion 48 as at 50 and 52, to clamp the nut against the opposite faces of the arm plate 28 adjacent the extremities of the transverse portion 42 of the cruciform slot.

The clamp strip 36 is bent as at 54 to form a complemental circular clamping face adapted to cooperate with the semi-circular recess 32, and at its end is bent substantially at right angles as at 56 and provided with an aperture 58 through which extends a headed screw 60 threaded in the nut 44 and adapted to have longitudinal movement in the longitudinal portion 62 of the cruciform slot 40.

The motor damping rings 18 may be grooved as at 64 to engage the opposite faces of the arm 26 around the recess 32 and engage the circular portion 54 of the clamp strap 36.

In Figure 6 is shown an alternative method of securing the threaded member in place. In this form, the threaded member is slotted across its outer end as at 66, and thereafter the lip portions 68 are upset axially of the length of the slot as shown at 68ª to secure the member in place.

It will be seen from the foregoing construction that a single person may readily position a motor with its damping rings in the recess 32 and thereafter with a single free hand, hook the clamping strap 36 in the hook 34 and manipulate the screw 60 into starting relation with the nut 44. Thereafter the screw 60 may be drawn up tight with great facility. Since the free parts are limited to the strap and screw, it is a simple matter for an operator to manipulate the parts and secure the motor by the use of a single hand while holding the motor in position with the other hand, and the use of cumbersome parts is completely eliminated.

While single specific forms of the invention have been illustrated and described, it is to be understood that the invention is not limited thereto. As various changes may be made without departing from the spirit of the invention, as will be apparent to those skilled in the art, reference will be had to the appended claims for a definition of the limits of the invention.

What is claimed is:

1. In a motor support bracket, a flat plate bracket arm, adapted to support a motor end with the motor shaft extending substantially perpendicular to the plane of said plate, said plate having a hook-like extension providing an open, substantially semi-circular saddle recess along the inside marginal edge of said hook-like extension, a notch in the outside marginal edge near the outboard end of said bracket arm, and a cruciform shaped open slot formed adjacent the inboard end of said recess, a threaded member secured in the transverse portion of said slot, a one-piece band member having a closed slot engaging said notch and a screw receiving aperture in alignment with the longitudinal portion of said open slot, said band being curved in its central portion to form a clamping member complemental to said saddle recess, and a screw in said aperture threaded in said threaded member, and extending longitudinally of said open slot, for drawing said band member about a substantially cylindrical motor end member.

2. In a motor support bracket, a flat plate bracket arm, adapted to support a motor end with the motor shaft extending substantially perpendicular to the plane of said plate, said plate having a hook-like extension providing an open, substantially semi-circular saddle recess along the inside marginal edge of said hook-like extension, a notch in the outside marginal edge near the outboard end of said bracket arm, and a cruciform shaped open slot formed adjacent the inboard end of said recess, a threaded member secured in the transverse portion of said slot, having its opposite side walls swaged into engagement with said arm on either side thereof, a one-piece band member having a closed slot engaging said notch and a screw receiving aperture in alignment with the longitudinal portion of said open slot, said band being curved in its central portion to form a clamping member complemental to said saddle recess, and a screw in said aperture threaded in said threaded member, and extending longitudinally of said open slot, for drawing said band member about a substantially cylindrical motor end member.

3. In a motor support bracket, a U stamping comprising a central mounting plate portion and spaced parallel end brackets folded substantially at right angles to the plate portion, each of said brackets having a substantially semi-circular recess for receiving the bearing portions of a motor or the like, a hook formed in each bracket adjacent one end of the recess, a cruciform shaped open slot formed in the bracket adjacent the other end of said recess, a threaded member secured in the transverse portion of said slot, a single one-piece clamp strip having a closed slot engaging said hook, at one end and a screw receiving aperture at the other, and a clamp screw passing through said aperture, threaded in said member, and extending lengthwise of and within said open slot.

4. In a motor support bracket, a U stamping comprising a central mounting plate portion and spaced parallel end brackets folded substantially at right angles to the plate portion, each of said brackets having a substantially semi-circular recess for receiving the bearing portions of a motor or the like, a hook formed in each bracket adjacent one end of the recess, a cruciform shaped open slot formed in the bracket adjacent the other end of said recess, a threaded member secured in the transverse portion of said slot, a one-piece clamp strip engaging said hook at one end and having a screw fastening means at the other, said screw means being threaded in said member, and extending lengthwise of and within said open slot.

5. In a motor support bracket, a U stamping comprising a central mounting plate portion and spaced parallel end brackets folded substantially at right angles to the plate portion, each of said brackets having a substantially semi-circular recess for receiving the bearing portions of a motor or the like, a hook formed in the bracket adjacent one end of the recess, a cruciform shaped open slot formed in the bracket adjacent the other end of said recess, a threaded member secured in the transverse portion of said slot, said member having its opposite side walls swaged and upset into engagement with the opposite faces of said brackets, a one-piece clamp strip engaging said hook at one end and having a clamp screw at the other, threaded in said member, and extending lengthwise of and within said slot.

6. In a motor support bracket, a flat plate bracket arm, adapted to support a motor end with the motor shaft extending substantially perpendicular to the plane of said plate, said plate having a hook-like extension providing an open, substantially semi-circular saddle recess along the inside marginal edge of said hook, means for securing a clamp strip adjacent one end of said recess, and a cruciform shaped open slot formed adjacent the other end of said recess, a threaded member secured in the transverse portion of said slot, having its opposite side walls swaged into engagement with said arm on either side thereof.

7. In a motor support bracket, a flat plate bracket arm, adapted to support a motor end with the motor shaft extending substantially perpendicular to the plane of said plate, said plate having a hook-like extension providing an open substantially semi-circular saddle recess along the inside marginal edge of said extension, a notch in the outside marginal edge near the outboard end of said bracket arm, threaded fastening means secured to said bracket arm adjacent the inboard end of said recess, a one-piece band member having a closed slot engaging said notch, and a screw receiving aperture in alignment with the axis of said threaded fastening means, said band being curved in its central portion to form a clamping member complemental to said saddle recess, and a screw in said aperture threaded in said fastening means for drawing said band member about a substantially cylindrical motor end member.

8. In a motor support bracket, a U stamping comprising a central mounting plate portion and an end bracket folded substantially at right angles to the plate portion, said bracket having a substantially semi-circular recess for receiving the bearing portion of a motor or the like, a hook formed in said bracket adjacent one end of the recess, a single one-piece clamp strip having a closed slot engaging said hook at one end and being curved in its central portion to form a clamping member complemental to said semi-circular recess and threaded fastening means cooperating with said clamp strip and the end bracket adjacent the other end of the recess.

9. In a motor support bracket, a flat plate bracket arm, adapted to support a motor and with the motor shaft extending substantially perpendicular to the plane of said plate, said plate having a hook-like extension providing an open substantially semi-circular saddle recess along the inside marginal edge of said hook-like extension, a hook formed in said bracket adjacent one of the recesses, a single one-piece clamp strip having means for engaging said hook at one end and being curved in its central portion to form a clamping member complemental to said semi-circular recess, and threaded fastening means cooperating with said clamp strip and the end bracket adjacent the other end of the recess.

CHARLES C. SCHEELE.

REFERENCES CITED

The following references are of record in the file of this patent:

UNITED STATES PATENTS

| Number    | Name    | Date          |
|-----------|---------|---------------|
| 1,106,279 | Burrows | Aug. 4, 1914  |
| 2,074,136 | Welch   | Mar. 16, 1937 |
| 2,209,477 | Reibel  | July 30, 1940 |